Jan. 18, 1938. M. W. SHEAFFER 2,105,866
HEADLIGHT CONTROL MEANS FOR MOTOR VEHICLES
Filed May 25, 1935 2 Sheets-Sheet 1
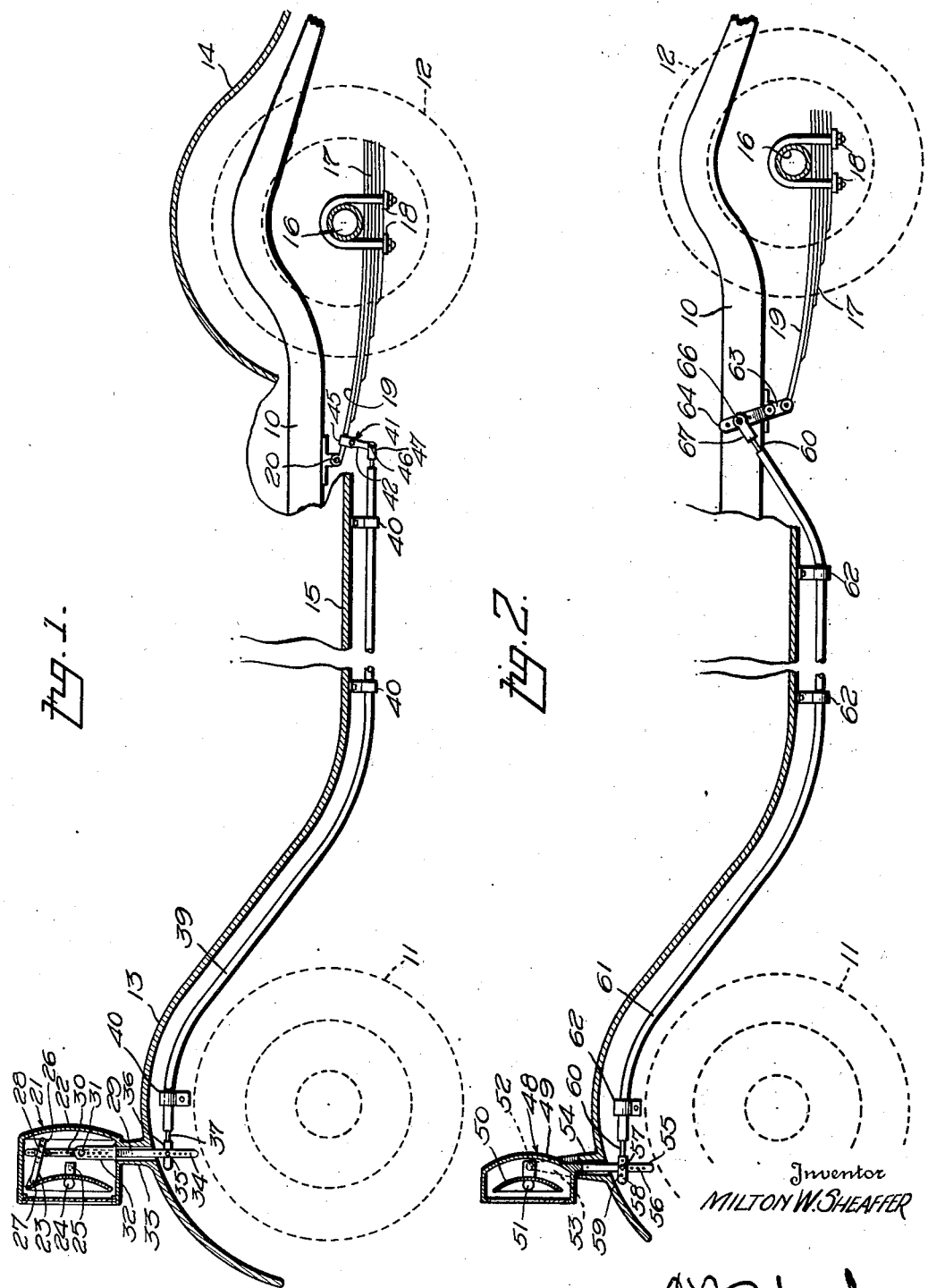
Inventor
MILTON W. SHEAFFER
By C. L. Parker Jr.
Attorney Jan. 18, 1938.  M. W. SHEAFFER  2,105,866
HEADLIGHT CONTROL MEANS FOR MOTOR VEHICLES
Filed May 25, 1935  2 Sheets-Sheet 2
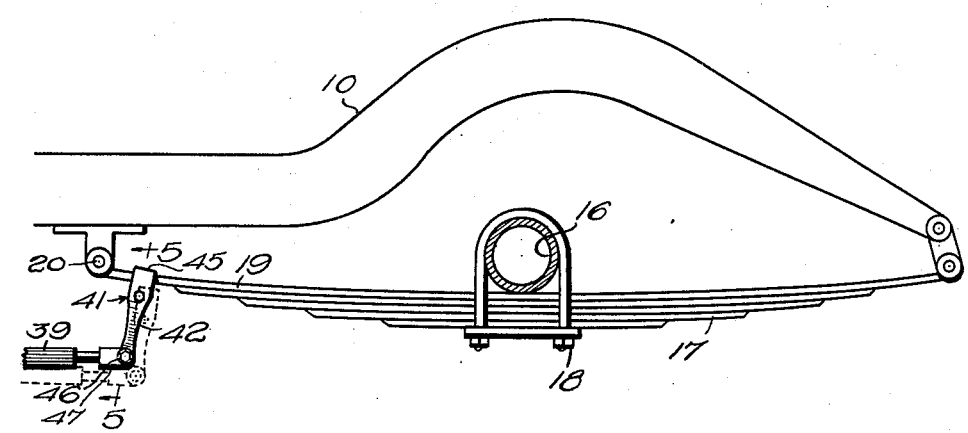
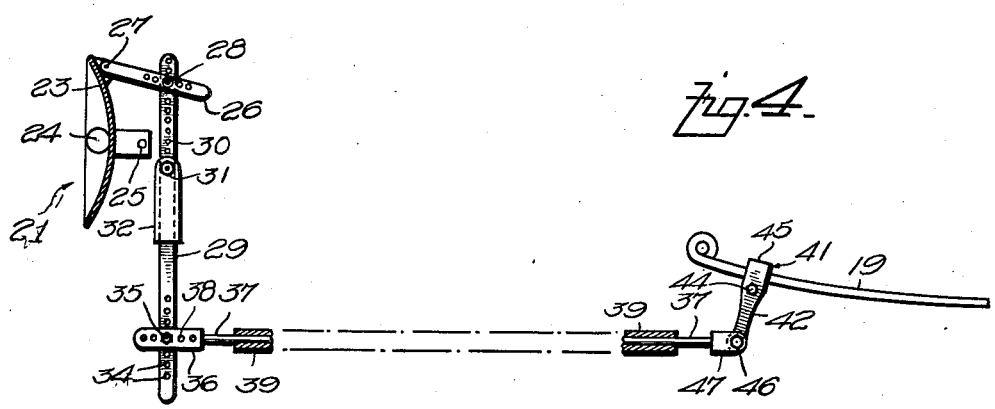
Inventor
MILTON W. SHEAFFER
By C. L. Parker, Jr.
Attorney Patented Jan. 18, 1938

2,105,866

UNITED STATES PATENT OFFICE 2,105,866

HEADLIGHT CONTROL MEANS FOR MOTOR VEHICLES

Milton W. Sheaffer, Hanover, Pa.

Application May 25, 1935, Serial No. 23,482

5 Claims. (Cl. 240—7.1)

This invention relates to headlight control means for motor vehicles, and is a continuation in part of my application Serial No. 744,417, filed September 17, 1934.

The headlights of motor vehicles are rigidly connected to the bodies of the vehicles as is well known, and accordingly it is obvious that the headlights of a vehicle move as a unit with the body. Many attempts have been made to provide non-glare headlights through the medium of the designs embodied in the reflectors and lenses of the lights, but such devices can be only partially successful, regardless of the accuracy with which the headlights are adjusted. This will be apparent when it is considered that headlight adjustment takes place with the vehicle at rest, and when the vehicle is traveling over a highway, the surface thereof causes the vehicle body to move with respect to the chassis, thus causing the headlight beam to constantly alter its angular relationship with the surface of the highway.

It is well known that a very slight change in the angularity of the headlights of a motor vehicle with respect to a highway will cause glare in the eyes of approaching drivers. The headlights are adjusted to provide the most intense light near the upper limit of the beam, and this intense illumination is elevated sufficiently to cause glare when the forward end of the vehicle body is elevated or the rear end of the vehicle body is depressed to a slight extent.

A large proportion of the accidents involving motor vehicles are caused by glaring headlights, and the danger of accident in night driving can be only partially removed by efficient headlights, no matter how accurately they are focused.

An important object of the present invention is to provide automatic control means for the headlights of a motor vehicle which is operative for preventing the headlight beams from tilting upwardly upon relative upward movement of the forward end of the vehicle body or relative downward movement of the rear end thereof.

A further object is to provide automatic means for controlling the headlights of a motor vehicle to limit the top of the beam in its upward movement to a position substantially corresponding to the proper focused position of the beam when the vehicle is at rest.

A further object is to provide automatic means for tilting the headlights of a motor vehicle to incline the headlight beams downwardly relative to the vehicle body when the latter tilts upwardly toward its forward end or downwardly toward its rear end.

A further object is to provide means for pivotally supporting the headlights or reflectors on axes transverse with respect to the vehicle, and to provide means operative upon the relative movement of the body referred to for swinging the headlights slightly about their pivot axes to prevent the beams from being thrown upwardly above their theoretically correct position.

A further object is to provide control means of the character referred to which is not affected by the slight vertical movement of the wheels of the vehicle when moving over relatively smooth highways, and wherein such movement of the wheel is not sufficient to transmit any relative tilting movement to the vehicle body.

A further object is to provide novel operating means which resiliently absorbs relatively slight vertical movement of the vehicle wheels without changing the relative position of the headlight beam with respect to the vehicle body.

A further object is to provide a device of the character referred to wherein resilient means is connected between the vehicle body and one of the axles thereof to be responsive to relative vertical movement between the body and the axle, and wherein the operating means for controlling the headlight was connected to the resilient means at a point spaced from the axle to permit the resilient means to absorb relatively slight vertical movement of the axle without transmitting such movements to the headlight.

A further object is to provide control means of the character referred to for motor vehicle headlights wherein the lights are controlled to a far greater extent under the influence of relative movement of the vehicle body with respect to the highway than under the influence of relative movement of the vehicle chassis with respect to the body, to thereby maintain the beams from the headlights in relatively fixed positions with respect to the highway.

A further object is to provide control means of the character referred to wherein relative movement is imparted to the headlights or the reflectors thereof by movement of the vehicle springs at points relatively close to the points of connection of the springs to the vehicle body.

Other objects and advantages of the invention will become apparent during the course of the following description.

In the drawings I have shown two embodiments of the invention. In this showing:

Figure 1 is a side elevation of a portion of a motor vehicle showing the invention applied, parts being broken away and parts being shown in section, Figure 2 is a similar view illustrating a modified form of the invention, Figure 3 is a side elevation of the rear end of a portion of the motor vehicle chassis illustrating the form of the invention shown in Figure 1, Figure 4 is an enlarged fragmentary vertical sectional view illustrating a portion of the main transmitting means, Figure 5 is an enlarged sectional view on line 5—5 of Figure 3, and, Figure 6 is a detail perspective view of the shackle lever employed with the form of the invention shown in Figure 2.

Referring to Figure 1, the numeral 10 designates a motor vehicle chassis having the usual forward and rear wheels 11 and 12 respectively. The vehicle is provided with the usual front and rear mud guards 13 and 14 respectively, between which the running board 15 is arranged. The vehicle further includes a rear axle housing 16 having opposite ends connected to the usual spring 17 by suitable clamping means 18. The spring 17 is shown as being of the laminated type, and the upper and longest leaf spring 19 is pivoted to the vehicle chassis as at 20.

The vehicle is provided at its forward end with a pair of headlights one of which is illustrated in Figure 1 and is designated as a whole by the numeral 21. This headlight includes a casing 22 having a reflector 23 therein supporting a light bulb 24. The reflector is pivoted to swing on a horizontal axis as indicated by the numeral 25, and a link 26 is pivotally connected at its forward end as at 27 to the reflector 23. The rear end of the lever 26 is provided with a pivot pin 28 connecting it to the upper end of a lever 29 which is provided with a series of openings 30 for adjusting purposes, as will become apparent. The pivot pin 28 operates in one of the openings 30, and another pivot pin 31 passes through one of the openings 30 to pivotally connect the lever 29 to a support 32 mounted within the headlight casing 22.

The headlight is shown as being supported with respect to the mud guard 13 by means of a hollow post 33 through which the lever 29 extends, the opening through the post 33 being sufficiently large to permit the lever to rock to a sufficient extent about the axis of the pivot pin 31. The lower end of the lever 29 is provided with a series of openings 34 to selectively receive a pivot pin 35 which pivotally connects the lower portion of the lever to an operating member 36 secured to the forward end of a Bowden wire 37. The operating member 36 also may be provided with a plurality of openings 38 to selectively receive the pivot pin 35 for purposes of adjustment. The Bowden wire 37 is slidable in a guide tube 39 which is secured at spaced points to the mud guard 13 and running board 15 by suitable brackets 40.

The means for operating the Bowden wire 37 is clearly shown in Figures 3, 4 and 5. Referring to Figure 5 the numeral 41 designates a two-part clamp including a depending arm 42 and a complementary clamping member 43 secured to the arm 42 as at 44. The members of the clamp 41 are provided with portions 45 adapted to engage the edge portions of the upper spring leaf 19 to maintain the arm 42 in fixed position with respect to the portion of the leaf spring 19 to which the clamping elements are attached. The lower end of the arm 42 carries a bolt 46 or other pivotal means connecting the arm 42 to an operating member 47, and the forward end of this member is connected to the rear end of the Bowden wire 37.

It will be apparent that the particular mechanical means associated with the headlight per se for tilting the beam downwardly is not of particular importance, and this result may be accomplished in a number of different ways. For example, the reflector itself in Figure 1 is adapted to turn about a horizontal axis, and in Figure 2 the entire headlight is adapted to partake of turning movement. The headlight is designated as a whole in Figure 2 by the numeral 48 and includes a housing 49 having a reflector 50 therein provided with a light bulb 51. The casing 49 may be adapted to swing about a horizontal axis 52 formed by pivot pins mounted in the upper ends of the arms 53 of a hollow post 54. This post is of sufficient internal size to permit sufficient forward and rearward swinging movement of an operating arm 55 connected at its upper end to the casing 49.

The arm 55 is provided with a plurality of openings 56 to selectively receive a pivot pin 57 by means of which the arm 55 is pivotally connected to an operating member 58. The operating member 58 also may be provided with a plurality of openings 59 to selectively receive the pivot pin 57 for purposes of adjustment. The operating member 58 is secured to the forward end of a Bowden wire 60 slidable in a tubular guide 61 fixed with respect to any desired parts of the vehicle, such as the forward mud guard and the running board, by brackets 62. It will be apparent that the Bowden wire 60, its guide tube 61 and brackets 62, are similar to the corresponding elements shown in Figure 1, except that the rear end of the guide sleeve 61 extends upwardly at its rear end for a purpose to be described.

The parts of the motor vehicle shown in Figure 2 correspond to the parts thereof illustrated in Figure 1 and have been designated by the same reference numerals except that a different form of spring shackle means is employed, as shown in Figures 2 and 6. The form of the invention illustrated in Figure 1 is applicable to springs employed with the so-called "Hotchkiss" type of drive wherein the forward ends of the rear springs are pivotally connected to the vehicle frame. The form of the invention shown in Figure 2 may be employed in a vehicle of the torque tube type wherein the forward ends of the rear springs are shackled to the vehicle frame for relative movement with respect thereto. Accordingly, the upper leaf 19 of the spring 17 in Figure 2 is shown as being shackled to the frame as at 63, and the shackles employed may be of any desired type. Where two parallel shackle members are employed, one of these members, and preferably the outer one, extends above its point of pivotal connection with the vehicle frame as indicated by the numeral 64, the upper end of the shackle member preferably being offset outwardly as shown in Figure 6 and provided with a plurality of openings 65 to selectively receive a bolt 66. This bolt pivotally connects the shackle extension 64 to an operating member 67, similar to the member 47 previously described and secured to the rear end of the Bowden wire 60.

The operation of the form of the device shown in Figures 1, 3, 4 and 5 is as follows:

It is the usual practice to focus and direct the beams from the headlights of a motor vehicle while the vehicle is at rest and unoccupied. It is well known among those skilled in the headlight art that when a vehicle is loaded, the headlights are inaccurately directed regardless of the accuracy with which they have been focused. For example, if one or more persons occupy the rear seat of the vehicle, the rear end of the vehicle body is depressed against the tension of the rear supporting springs, thus slightly altering the angularity of the vehicle body with respect to the highway. Under such conditions, headlights which have been properly aimed will direct their beams upwardly to a slight extent which is sufficient, in actual practice, to cause glare in the eyes of approaching drivers.

It will be apparent that this disadvantage is wholly eliminated with the present device. If the headlights are properly focused and directed, the occupation of the rear seat of the vehicle will depress the rear end of the vehicle body, thus moving the spring mounting 20 downwardly with respect to the axle housing 16, thus somewhat straightening the upper spring leaf 19 and moving it slightly closer to a horizontal position. This action obviously moves the arm 42 to a slight extent, the rear end of the arm moving rearwardly to a slight extent and thus exerting a pull on the Bowden wire 37. This pull is transmitted through the Bowden wire to the lower end of the lever 29, thus moving this lever forwardly at its upper end and transmitting a similar movement to the reflector 23. The axis of the reflector then will be slightly inclined downwardly and forwardly with respect to the vehicle body to compensate for the slight change in the angular position of the body with respect to the highway. The parts may be properly adjusted by placing the pivot pins 28, 31 and 35 in selected openings, as will be apparent.

The present device is not only effectively operative for changing the direction of the headlight beams in accordance with varying loads of the vehicle, but it is also automatically operative, while the vehicle is being driven, to prevent the headlight beams from moving upwardly above their theoretically proper limits. In this connection, it may be pointed out that several previous attempts have been made to accomplish the results of the present construction, and such prior constructions have been operative for preventing the headlight beam from being directed upwardly and forwardly at an angle with respect to the highway. These prior devices however, have had the disadvantage of almost constantly shifting the light beams upwardly and downwardly even though they prevent the beam from moving upwardly beyond a predetermined limit. This constant vertical movement of the headlight beams is highly annoying to the driver of the vehicle and is due to two causes.

In the first place, the wheels of a vehicle sometimes pass over relatively small but sharp uneven places in the roadway which cause the wheels of the vehicle to be elevated only for an instant, and it frequently happens that the wheels will return to their normal position so quickly as to dissipate the energy stored in the vehicle springs without transmitting such energy to the vehicle body. In the second place, all highways, no matter how smooth, are sufficiently irregular to cause the wheels of a motor vehicle to partake of what may be termed a vertical vibratory motion under the most favorable conditions. Such a vibratory motion is transmitted to the headlights of the prior devices referred to, thus causing an appearance of flickering by constantly moving the light beams vertically to a small extent.

The two conditions referred to thus cause vertical movement of the light beam when there is no change in the position of the vehicle body to render such movement of the beam desirable. These disadvantages are overcome with the present device, as will become apparent. While I have utilized the springs of a motor vehicle as the actuating source for transmitting movement to control the headlight beams, it will be understood that these springs are to be considered broadly as resilient means connected between the chassis and body of the vehicle with the motion transmitting means connected thereto at a point remote from the axle. It has been found that the minor irregularities in smooth road surfaces are substantially completely absorbed by the springs of the motor vehicle, and accordingly the motion transmitting means of the present device is connected to the springs adjacent their point of connection with the vehicle frame and remote from the connection of the springs with the axle. The minor irregularities of the roadway which are not transmitted to the vehicle body accordingly are absorbed by the vehicle springs and are not transmitted to the reflector 23 to tilt the headlight beam.

Theoretically, the springs 17 could partake of the same limitation and shape upon a given upward movement of the axle or an equal downward movement of the vehicle chassis. According to such theoretical operation, therefore, the vehicle headlights would be tilted regardless of whether the axle moves upwardly or the body moves downwardly. I have discovered, however, that this theoretical operation does not take place in actual practice due to the inertia of the parts. When the wheels of the vehicle pass over a small sharp raised element in the roadway of such character that the wheels rise and fall substantially instantaneously, the action referred to may take place without affecting the position of the vehicle body. This is due partly to the inertia of the spring elements, and under such conditions, negligible movement is transmitted to the reflector 23. If, due to other irregularities in the road surface, the vehicle chassis should move downwardly to the same extent, as in the previous case referred to, the arm 42 will immediately alter its position, and effect the proper movement of the reflector 23. The association of the motion transmitting means with a resilient connection between the axle and vehicle body therefore, is highly advantageous in that it maintains the beams far more uniformly in their theoretically correct positions than is possible with devices of the type which depend on a definite relationship of the movement of the vehicle chassis and the axle or mechanical elements connected thereto.

The operation of the form of the invention shown in Figure 2 is substantially identical with that previously described and need not be referred to in detail. The shackle arm 64 is influenced by movement of the forward end of the spring leaf 19 and does not move under the influence of the vertical vibratory motion of the axle previously referred to. Under conditions, wherein the rear end of the vehicle body moves downwardly with respect to the highway, however, the shackle arm 64 moves rearwardly to pull the Bowden wire 60, thus pulling the arm 55 rearwardly and tilting the headlight casing 49 to incline the axis of the reflector downwardly and forwardly with respect to the vehicle body. In other words, the modified form of the invention as in the form previously described, provides headlight actuation through resilient means connected to the vehicle axle, the actuating means being connected to the resilient means at a point remote from the axle.

The foregoing description may be assumed to define the operation of the device upon downward movement of the rear end of the vehicle frame, but substantially the same operation takes place upon relative upward movement of the forward end of the vehicle body, which normally would tend to project a glaring beam in exactly the same manner. I have found that when the forward end of the vehicle body moves upwardly incident to uneven road surfaces, the vehicle body tends to pivot about its center of mass, and accordingly upward movement of the forward end of the body is accompanied by corresponding movement of the rear end thereof, whereby the present device functions in the manner described.

From the foregoing it will be apparent that the present invention prevents the headlight beams of a motor vehicle from being projected upwardly above their theoretically correct limits, and that it likewise functions to prevent unnecessary downward tilting of the beams. Accordingly the beams maintain a substantially constant position with respect to the highway without assuming a glaring angle and without unnecessarily moving vertically, which would create annoying flickering effect in the eyes of the driver. It also will be apparent that the latter result is accomplished by the novel association of the headlight actuating means with resilient means connected with the vehicle axle. The device accordingly contributes a material factor of safety in the operation of motor vehicles and is advantageous to the driver of the vehicle equipped with the device in view of the fact that it maintains an efficient illumination of the highway.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. Headlight control mechanism for a motor vehicle comprising a headlight, movable means connected to the headlight for vertically moving the beam thereof, resilient means connected for vertical movement with a wheel of the vehicle with respect to the body thereof, and motion transmitting means connected at one end to said movable means and having its other end connected for actuation by said resilient means at a point spaced from the point of connection of the latter with respect to said vehicle wheel.

2. Headlight control mechanism for a motor vehicle comprising a headlight, movable means connected to the headlight for vertically moving the beam thereof, a spring connected between the vehicle body and the running gear thereof, said spring comprising laminations of different lengths and having the longest lamination connected to the vehicle body, and motion transmitting means connected at one end to said movable means and having its other end connected for actuation by the longest lamination of the vehicle spring at a point remote from the connection between the vehicle spring and the running gear.

3. Headlight control mechanism for a motor vehicle comprising a headlight, movable means connected to the headlight for vertically moving the beam thereof, a spring connected between the vehicle body and the running gear thereof, said spring comprising laminations of different lengths and having the longest lamination connected to the vehicle body, the connection between the vehicle spring and the body thereof comprising a shackle, and motion transmitting means connected at one end to said movable means and at its opposite end to said shackle.

4. Headlight control mechanism for a motor vehicle comprising a headlight, movable means connected to the headlight for vertically moving the beam thereof, a spring connected between the vehicle body and the running gear thereof, said spring comprising laminations of different lengths and having the longest lamination connected to the vehicle body, an arm clamped to said longest lamination and depending therefrom adjacent its point of connection with the vehicle body, and motion transmitting means connected between said movable means and the free end of said arm.

5. Headlight control mechanism for a motor vehicle comprising a headlight, movable means connected to the headlight for vertically moving the beam thereof, a spring connected between the vehicle body and the running gear thereof, said spring comprising laminations of different lengths and having the longest lamination connected to the vehicle body, the connection between said spring and the vehicle body comprising a shackle pivotally connected to said longest spring lamination, and pivotally connected to the vehicle body at a point higher than the pivotal connection with said spring lamination, said shackle having an extension projecting upwardly above the pivotal connection of the shackle with the vehicle body, and motion transmitting means connected between said movable means and said extension.

MILTON W. SHEAFFER.